United States Patent [19]
Cozzi et al.

[11] 4,304,876
[45] Dec. 8, 1981

[54] STRUCTURAL FOAMS OF UNSATURATED POLYESTER RESINS

[75] Inventors: Ennio Cozzi, Cantalupo; Massimo Tardani, Bosto Arsizio, both of Italy

[73] Assignee: Snia Viscosa, Milan, Italy

[21] Appl. No.: 1,868

[22] Filed: Jan. 8, 1979

Related U.S. Application Data

[62] Division of Ser. No. 838,668, Oct. 3, 1977, Pat. No. 4,151,335.

[30] Foreign Application Priority Data

Oct. 5, 1976 [IT]  Italy ............................... 28001 A/76

[51] Int. Cl.$^3$ ............................................. C08J 9/30
[52] U.S. Cl. ................................... 521/138; 521/139; 521/140; 525/49
[58] Field of Search ........................... 521/138; 525/49

[56] References Cited

U.S. PATENT DOCUMENTS 3,502,602  3/1970  Helm et al. .......................... 525/425
3,975,348  8/1976  Christena ............................. 525/12
4,151,335  4/1979  Cozzi et al. ........................ 521/138

*Primary Examiner*—Morton Foelak
*Attorney, Agent, or Firm*—Hubbell, Cohen, Stiefel & Gross

[57] ABSTRACT

Unsaturated polyester resins having an acidity number of 5–90 mg. KOH/g. and a molecular weight of 500–5000 and which are capable of entrapping air or other inert gases so as to form structural foams and contain in the chain 0.1 to 20 mol % of amide and/or amine groups. These groups are preferably derived from the reaction of an organic compound having two reactive groups at least one of which contains nitrogen with the polycarboxylic acid and/or polyvalent alcohol contained in the polyester resin.

2 Claims, No Drawings

STRUCTURAL FOAMS OF UNSATURATED POLYESTER RESINS

This is a division, of application Ser. No. 838,668, filed Oct. 3, 1977, now U.S. Pat. No. 4,151,335 filed Apr. 24, 1979.

BACKGROUND OF THE INVENTION

1. Field of the Invention

The present invention relates to structural foams made of unsaturated polyester resins and to processes for preparing same.

2. The Prior Art

The term "unsaturated polyester resins" as used herein means those resins obtained by the polymerization of a mixture of an unsaturated polyester, formed by the polycondensation of at least one $\alpha,\beta$-ethylenically unsaturated dicarboxylic acid with a polyvalent alcohol, and an ethylenically unsaturated monomer copolymerizable therewith. Some examples of ethylenically unsaturated dicarboxylic acids are maleic, fumaric, itaconic and mesaconic acids. Along with the unsaturated dicarboxylic acids it is possible to employ mono or polyfunctional saturated aliphatic carboxylic acids, such as adipic, succinic and glutaric acid and the like; mono or polyfunctional aromatic carboxylic acids, such as phthalic, isophthalic, terephthalic, benzoic acids etc., and anhydrides such as the phthalic anhydrides and the trimellitic anhydrides.

As polyvalent alcohols it is possible to use ethylene glycol, propylene glycol, 1,2 butane diol, diethylene glycol, 1,6 hexane diol, trimethylol propane, pentaerythritol, glycerol, neopentylglycol, 1,4-cyclo-hexane-diol, etc.

Unsaturated monomers suitable for being used are those containing an $\alpha,\beta$-ethylenically unsaturated bond and which are capable of polymerizing with the unsaturated polyester. Such unsaturated monomers are for example the copolymerizable aromatic hydrocarbons, such as styrene and alkyl derivatives thereof, e.g., methyl-styrene, vinyl-toluene, divinyl-benzene, etc.; esters of acrylic or methacrylic acid with alcohols containing 1 to 8 carbon atoms, such as methyl acrylate, ethyl acrylate, butyl acrylate, and the corresponding esters of methacrylic acid; amides such as acrylamide and methacrylamide; N-methylamides such as N-methyl-acrylamide; etherified N-methylamides such as N-butoxymethylacrylamides; nitriles of $\alpha,\beta$-unsaturated monocarboxylic acids, such as acrylonitrile and methacrylonitrile; vinyl esters of mono or polycarboxylic acids, such as vinyl acetate, vinyl propionate, divinyl succinate, etc.; N-vinyl compounds such as vinyl pyrrolidone; vinyl ethers of mono or poly-alcohols, such as isobutyl-vinyl-ether; allyl compounds such as the allyl esters of saturated or unsaturated mono or poly-carboxylic acids, such as diallyl-phthalate, diallyl-maleate, diallyl-isophthalate, etc.; allyl ethers of mono or poly-alcohols. In general the aromatic hydrocarbons are the most often used monomers. The monomeric compounds hereinabove mentioned may be used alone or mixed with one another.

Solutions of these unsaturated polyester resins in ethylenically unsaturated monomers are very difficult to foam so as to form structural foams, because they retain only with great difficulty air or inert gases entrapped in a regular and stable manner.

With a view toward overcoming this drawback it has heretofore been suggested to utilize expanding agents, either of the chemical or physical type, such as, for example, isocyanates or Freon 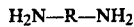, which are added to the unsaturated polyester resin at the moment of foam formation.

Such agents, however, have not led to satisfactory results because the copolymerization temperature of the unsaturated polyester resin solutions in ethylenically unsaturated monomers begins to rise very slowly. As a result of this, the resin undergoes gelation well before the temperature is high enough to completely activate the expanding agent.

It has also been suggested to add to the unsaturated polyester resin solution an additive capable of modifying the surface tension of the resin in contact with air, i.e., an air-resin surfactant, such as piperidine, maleic anhydride, tetrahydrophthalic anhydride, urea, melamine and resins thereof, thiocarbamates, butylcarbamate, etc., and then to entrap the air into the mass by means of a mixing device. Still, in order to succeed in obtaining acceptable density values of the foams, i.e., of the order of 0.3, corresponding to 300 kg./cm$^3$, these surfactants need to be added in amounts generally not less than 10% by weight.

However, so high an amount of additive causes, in general, a deterioration of the mechanical characteristics of the structural foams eventually obtained. Furthermore, many of these additives are converted to the gaseous state during the cross-linking, and this causes, both in closed and open molds, a quite non-homogeneous size distribution of the resulting bubbles.

Finally, some of these additives interreact with the components of the catalyst system, thus slackening the cross-linking kinetics or, as in the case of the anhydrides, the moisture forms highly corrosive acids.

It is an object of this invention to provide a resin capable of entrapping air or other inert gases, without the abovedescribed disadvantages.

SUMMARY OF THE INVENTION

According to the invention, there have now been discovered unsaturated polyester resins which are capable of entrapping air or other inert gases in a manner which enables these resins to be formed into structural foams without the drawbacks of the prior techniques. This is achieved by incorporating in the chain of the saturated polyester resin, from 0.1 to 20 mol % of amide and/or amine groups. These groups are preferably derived from the reaction between the polycarboxylic acid and/or polyvalent alcohol used to prepare the polyester resin, and an organic compound containing the reactive groups at least one of which contains nitrogen.

Preferably, the amide and/or amine group concentration is 0.5–5 mol% with respect to the final unsaturated polyester resin, because such concentrations permit one to achieve the best results.

The organic compound containing two reactive groups at least one of which contains nitrogen may be:

(a) a diamine of the formula:

$$H_2N-R-NH_2$$

wherein R is substituted or unsubstituted $C_1$–$C_{12}$ alkylene, $C_6$–$C_{12}$ arylene or $C_7$–$C_{12}$ alkylarylene;

(b) an aliphatic or aromatic diamine of the formula:

wherein R is as defined above and $R_1$ and $R_2$ are independently selected from the group consisting of $C_1$–$C_5$ alkyl;

(c) an amino acid of the formula:

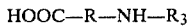

wherein R is as defined above and $R_3$ is hydrogen or a $C_1$–$C_5$ alkyl;

(d) a lactam of the formula:

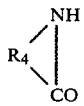

wherein $R_4$ is a $C_2$–$C_{10}$ alkylene; or (e) a diisocyanate of the formula:

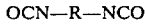

wherein R is as defined above.

Specific examples of such organic compounds are pyrrolidone, ε-caprolactam hexamethylenediamine, paraphenylenediamine, toluene diisocyanate, anthranilic acid, p-aminobenzoic acid, α-aminobutyric acid, glycocoll, etc.

The active amide and/or amine groups may be introduced into the chain of the unsaturated polyester resin either by preparing a resin having a high content of such groups, for example from 5 to 30 mol %, and then diluting it with an unsaturated polyester resin which does not contain such groups, or in one step by suitably formulating the mixture of monomers to be reacted.

The unsaturated polyester resins according to the present invention can be prepared using known techniques, either in the solvent phase or in the dry phase, but modified, of course, to take into account the inclusion of the above nitrogen containing organic compound.

According to a practical and preferred embodiment of the invention, the unsaturated polyester resin containing the amide and/or amine groups is obtained by reacting 1 to 1.3 moles of a polyvalent alcohol, 0.05 to 1 mole of an ethylenically unsaturated dicarboxylic acid and 0.1 to 1.3 moles of an organic compound containing two reactive groups at least one of which contains nitrogen. Polycondensation is carried on until there is obtained a polymer having an acidity number ranging from 5 to 90 mg. of KOH/g. of resin, preferably between 10 and 30 mg. of KOH/g. and a molecular weight between 500 and 5000.

In addition to the ethylenically unsaturated dicarboxylic acid, the reaction mixture may also contain a saturated dicarboxylic acid in amounts ranging from 5 to 95 mol %, with respect to the unsaturated dicarboxylic acid.

The resulting unsaturated polyester is then mixed with an unsaturated monomer copolymerizable therewith or with a mixture of such monomers in a polyester/monomer ratio between 20:80 and 90:10, preferably between 30:70 and 80:20.

Still other substances may be added to the mixture in order to impart to the final product particular desired characteristics. Such substances are, for example: polybutadiene, polystyrene, cellulose acetobutyrate, ethyl polyacrylate, acrylonitrile-butadiene-styrene copolymers, etc.

Inhibitors and stabilizers for preventing premature cross-linking of the mixture may be added to the monomer/unsaturated polyester mixture, in amounts ranging from 0.1 to 10,000 ppm.

The most preferred inhibitors and stabilizers are: hydroquinone, quinone, quinhydrone, t-butyl-pyrocatechol, toluene hydroquinone, mono-tert.butyl-hydroquinone, di-tert.butyl-hydroquinone, 1,4-naphthoquinone, anthraquinone, methyl and/or ethyl ethers of hydroquinone, picric acid, trinitro-benzene, p-phenylene-diamine, etc.

Moreover, in order to further improve the stability of the resin, organic or inorganic, polyester-soluble copper salts or quaternary ammonium salts, etc. are also added.

The thus obtained unsaturated polyester resin is then mixed with air under continuous stirring and a catalytic system of the known type is added. A soft and homogeneous foam is formed, which can be poured into molds and left to stand under atmospheric conditions for a time sufficient to obtain complete cross-linking whereby a rigid foam is formed.

As the catalytic system one may use any compound or mixture of compounds that generate free radicals under the particular polymerization conditions. These compounds are: peroxides or hydroperoxides, such as diacetyl-peroxide, benzoyl-peroxide, diethyl peroxide, hydrogen peroxide, cumene hydroperoxide, methylethyl-ketone-peroxide, etc. Other catalysts capable of generating free radicals may also be used, such as, for example, ammonium persulphate, perborates and percarbonates.

In the following working examples, methyl-ethyl-ketone peroxide (MEK-P) was used, but the other peroxides and hydroperoxides also give satisfactory results.

In addition to the free radical-generating catalyst it is preferable to employ an accelerator that increases the decomposition rate of the peroxide compound, which produces, as a consequence, free radicals at higher rates. Cobalt naphthenate, diluted with styrene to a concentration of about 1–3% b.w. of metal, is generally employed as such an accelerator.

A complexing agent to increase the efficiency of the accelerator may also be used. It is generally accepted that these complexing agents act as reducers of the cobalt naphthenate, thereby transforming them into the corresponding, much more reactive cobaltous compounds. Tertiary aromatic amines, preferably dimethyl aniline, are generally employed as such complexing agent.

The unsaturated polyester containing the amide and/or amine groups, according to the invention can be stored for a long period of time and permits one to obtain foams which are stable for long periods.

Furthermore, no gas or vapors evolve during the cross-linking, nor do migration phenomena occur, because the entire foamed mass is chemically bound.

DESCRIPTION OF THE PREFERRED EMBODIMENTS

The following examples are given to illustrate the invention, without, however, being a limitation thereof.

EXAMPLE 1

A 1-liter glass reactor was charged, with stirring, with 452.8 g. of ε-caprolactam and 152.2 g. of propylene glycol. The mixture was then heated to 110°–120° C. and kept at this temperature for 30–40 minutes. Then, 196.2 g. of maleic anhydride were added and the temperature was brought to 210° C. The reaction was carried on until the acidity number of the thereby formed resin reached 14.5 mg. of KOH/g. of resin. 728 g. of resin were obtained, to which 390 g. of styrene, stabilized with 0.0559 g. of hydroquinone and 0.22 cc of a 1% alcoholic solution of copper in the form of cupric chloride were added (component A).

Separately, a second resin (component B) not containing amine and/or amide groups was prepared by reacting, in a 1-liter glass reactor 312.7 g. of propylene glycol, 209.3 g. of maleic anhydride and 224.8 g. of ortho-phthalic anhydride.

This mixture was heated to 210° C. for about 4 hours, and condensation was continued until a resin having an acidity number of 42 mg. of KOH/g. of resin was obtained. 344 g. of styrene and 0.1 g. of hydroquinone were added to 655 g. of the thus obtained resin after cooling the resin.

Into a 5-liter reactor the following were charged
900 g. of the above-obtained component B,
100 g. of the above-obtained component A,
0.4 g. of cobalt naphthenate at 6% with respect to cobalt, and
10 g. of silicone oil (as a regulator of the dimensions of the foam bubbles).

These products were mixed with air by means of a whip stirrer rotating at 1500 rpm. After 20 minutes of stirring, 20 cc of methyl-ethyl-ketone peroxide in a 50% solution in dimethylphthalate were added thereto.

The mixture was stirred for a further 10 minutes, thereby obtaining a foam the volume of which was three times that of the starting reagents, the stability time being 20–30 minutes and which was suited to be poured into molds.

After about 1 hour the resin was completely polymerized and the foam had become rigid and removable from the mold. The mechanical characteristics of the foam were as follows:

| | |
|---|---|
| Resistance to flexure (determined according to ASTM D 790/71) | 140 kg./cm$^2$ |
| Flexural modulus of elasticity (determined according to ASTM D 790/71) | 6000 kg./cm$^2$ |
| Resistance to compression (determined according to ASTM D 1621/73) | 250 kg./cm$^2$ |
| Impact strength (determined according to ITALIAN STANDARD UNI 6062/67) | 0.9 kg./cm/cm$^2$ |
| Density (determined according to ASTM D 1622/63) | 0.55 kg./cm$^3$ |

EXAMPLE 2

A 2-liter glass reactor was charged, under stirring, with the following: 113 g. of ε-caprolactam, 761 g. of propylene glycol, 548 g. of maleic anhydride, and 582 g. of ortho-phthalic anhydride. The mixture was heated to 150° C. until the components melted, and then to 210° C. for 3 hours.

Polycondensation was continued until a resin having an acidity number of 30 mg. of KOH/g. of resin was obtained. About 1820 g. of resin were obtained. To this resin 980 g. of styrene stabilized with 0.28 g. of hydroquinone and 0.84 cc of a 1% alcoholic solution of copper in the form of cupric chloride were added thereto.

1000 g. of the thus obtained mixture were introduced into a 5-liter glass reactor, to which 3.4 g. of cobalt naphthenate at 6% in respect of cobalt and 10 g. of silicone oil were added.

The mixture was stirred and admixed with air through stirring by means of a whip stirrer under the same conditions as set forth in Example 1.

The remainder of Example 1 was repeated and the resulting hardened structural foam exhibited the same characteristics as that obtained in Example 1.

Variations and modifications can, of course, be made without departing from the spirit and scope of the invention.

Having thus described our invention, what we desire to secure by Letters Patent and hereby claim is:

1. A stable solid foam formed from an unsaturated polyester resin capable of mechanically entrapping air or other gases therein to form a liquid foam which is transformed into the stable solid foam by curing with conventional initiator and accelerator systems, wherein the resin is formed by the polymerization of a mixture of (a) an unsaturated polyester obtained from the polycondensation of at least one saturated dicarboxylic acid or anhydride and/or at least one α,β-ethylenically unsaturated dicarboxylic acid or anhydride, at least one polyvalent alcohol; and ε-caprolactam; (b) at least one ethylenically unsaturated monomer copolymerizable therewith; (c) a conventional curing system comprising initiators and accelerators; and (d) an agent capable of stabilizing the liquid foam for a sufficient time to allow curing of same to form the stable solid foam, said resin containing, in its polymeric chain, 0.1 to 20 mol% of amide and/or amine groups and having an acidity number between 5 and 90 mg. of KOH/g. of resin and a molecular weight between 500 and 5000.

2. A stable solid foam according to claim 1, wherein the unsaturated polyester resin capable of entrapping air or other inert gases comprises a mixture of an unsaturated polyester resin having a content of amide and/or amine groups in the polymeric chain ranging from 5 to 30 mol%, and an unsaturated polyester resin not containing said amide and/or amine groups.

* * * * *